United States Patent
Yagiela et al.

[11] 3,855,843
[45] Dec. 24, 1974

[54] SURFACE FINISH MEASURING GAUGE

[75] Inventors: Frank D. Yagiela, Livonia; Millard D. Crowell, Whitmore Lake, both of Mich.

[73] Assignee: General Motors Corporation, Detroit, Mich.

[22] Filed: May 31, 1973

[21] Appl. No.: 365,462

[52] U.S. Cl. .................... 73/37, 33/DIG. 2, 73/105
[51] Int. Cl. ............................................. G01b 5/28
[58] Field of Search ............ 73/37, 37.5, 37.6, 37.7, 73/105; 33/147 R, DIG. 2

[56] References Cited
UNITED STATES PATENTS

| | | | |
|---|---|---|---|
| 1,946,924 | 2/1934 | Allen et al. | 33/DIG. 2 |
| 2,383,742 | 8/1945 | Russell | 33/147 R |
| 2,417,988 | 3/1947 | Mooney | 73/105 X |
| 2,618,965 | 11/1952 | Gray | 73/37 |
| 2,901,906 | 9/1959 | Emmons | 73/37 |

Primary Examiner—Richard C. Queisser
Assistant Examiner—Joseph W. Roskos
Attorney, Agent, or Firm—Donald F. Scherer

[57] ABSTRACT

A surface finish measuring gauge using fluid flow to indicate surface roughness. The device has a triangular base with two adjustable supporting legs depending from apices of the base. The third apex has a tubular member secured thereto, which tubular member has a spherical end thereon and is adapted to permit fluid flow therethrough. A measuring head member has a spherical portion, mating with the spherical end of the tubular member, and has a through passage aligned with a passage in the tubular member. The two supporting legs and the measuring head provide three point contact with the surface to be measured. The measuring head, due to the spherical portions, automatically adjusts to the general contour of the surface. Measurement of fluid flow, past an annular edge on the measuring head adjacent the surface to be measured, provides a reading proportional to surface roughness.

3 Claims, 3 Drawing Figures

PATENTED DEC 24 1974

3,855,843

SURFACE FINISH MEASURING GAUGE

This invention relates to measuring devices and more particularly to fluid gauges for measuring surface finish.

Prior art surface finish measuring devices are primarily of the electronic type. The most commonly used device to measure surface finish is known as a profilometor which consists of a stylus resting on the surface to be measured and an electronic control connected to the stylus. Relative movements between the stylus and the surface causes the stylus to move vertically in response to minute changes in the surface. The vertical movement of the stylus are picked up by the electronic control and amplified to be recorded on a chart. The profilometor while being very accurate is also a very expensive measuring device.

The present invention provides a surface finish measuring tool which utilizes the flow of fluid, such as air, to determine the surface finish of the part to be measured, and has a triangular shape member from which depend three support members adapted to rest on the surface to be measured. One of the support members is adapted to direct air flow across between the support member and the imperfections in surface. The amount of fluid flow is proportional to the roughness of the surface.

To maintain sensitivity and speed in reading the surface finish, the contact area on the support member is maintained at a minimum value. To reduce the effect of changes of the general contour of the surface to be measured, the measuring support member is mounted pivotally in a ball and socket joint to permit the supporting member to pivot freely thereby maintaining a parallel relationship with the general contour of the surface.

It is an object of this invention to provide an improved surface finish measuring device which utilizes fluid flow between a measuring surface on the measuring device and imperfections in the surface to be measured to indicate the roughness of the surface.

It is another object of this invention to provide an improved surface finish measuring device in which three support points are provided, one of which support points has a measuring surface contacting the surface to be measured such that all flow between the surfaces is proportional to the surface finish.

It is another object of this invention to provide an improved fluid gauge surface finish measuring device having three support points in which one of the support points is pivotally mounted on the fluid gauge to maintain a measuring surface thereon in contact with the surface being measured.

Other objects and advantages of the present invention will be more apparent from the following description and drawings in which.

Figure 1:
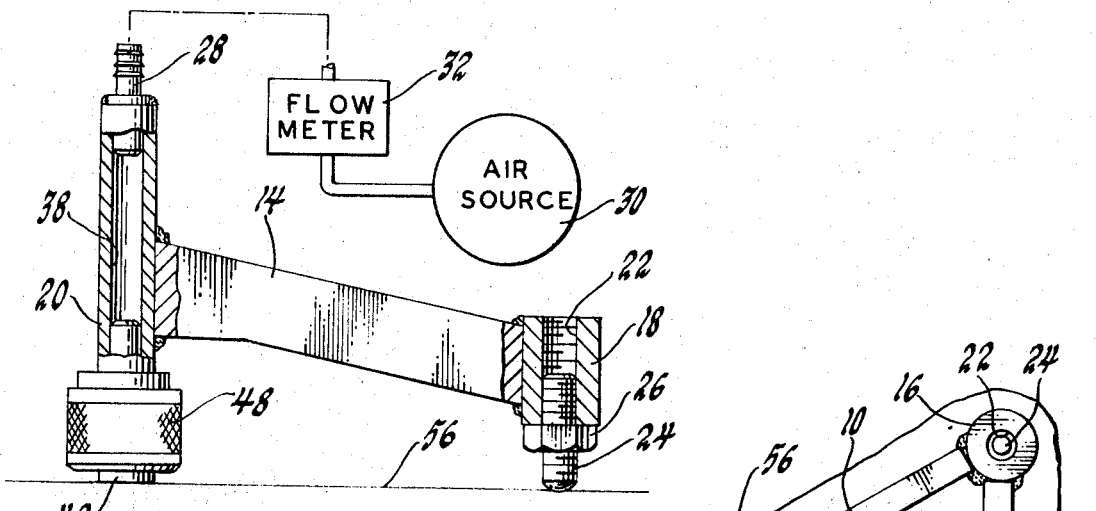
FIG. 1 is a partial sectional elevational view of the preferred embodiment of the inventon.
Figure 2:
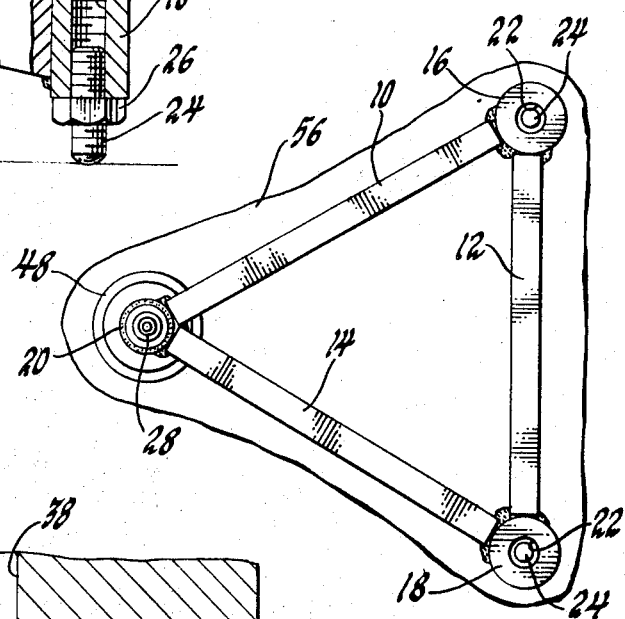
FIG. 2 is a top view of the preferred embodiment of the invention.

Referring to the drawings wherein like characters designate like or corresponding parts, there is shown in FIGS. 1 and 2 a fluid gauge having a triangular base formed by legs 10, 12, and 14. Secured to apex of the angle formed by legs 10 and 12 is a support post 16, secured to the apex of the angle formed by legs 12 and 14 is a support post 18, and secured to the apex of the angle formed by legs 10 and 14 is a tubular support post 20. The support posts 16 and 18 are identical in construction and have a female threaded portion formed therein as shown at 22 in FIG. 1. A male threaded member, such as 24 shown in FIG. 1, is threadably connected to the support post 18 and 16 and secured thereto by a fastener 26 which is threaded on the male member 24 into abutting relationship with the support post 18 or 16.

Figure 3:
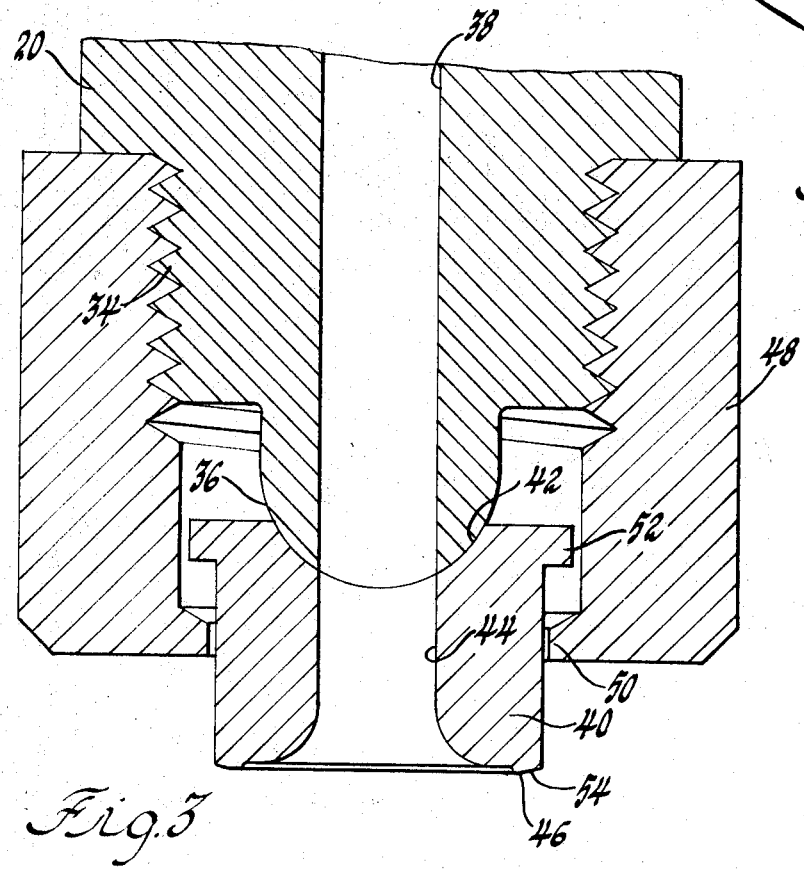
FIG. 3 is an enlarged sectional view of a portion of the preferred embodiment.

The tubular member 20 has secured at one end a fluid connector 28 which is adapted to be connected to an air source and a flow meter, such as those shown schematically at 30 and 32 respectfully in FIG. 1. The other end at tubular member 20 has a threaded portion 34 and a spherical seat portion 36, as shown in FIG. 3. A fluid passage 38 is open from end to end through the tubular member 20 such that fluid enters through connector 28, passes through the passage 38, and exhausts through the spherical seat 36.

A measuring head 40, mounted on the tubular member 20, includes a spherical recess 42 adapted to mate with the spherical seat 36. A fluid passage 44 is formed in the measuring head 40 and conducts fluid from the passage 38 to a measuring surface 46 which surrounds the lower opening of passage 44. The measuring head 40 is maintained in close relationship with the spherical seat 36 by a fastener 48 which is threadably secured to the threaded portion 34 of the tubular member 20. The fastener 48 has a shoulder portion 50 surrounding the measuring head 40 which cooperates with a shoulder 52 on the measuring head 40 to prevent the measuring head 40 from becoming detached from the air gauge. The measuring head 40, can, of course, be readily changed on the gauge by removing the fastener 48 to permit the insertion of a different measuring head.

The measuring surface 46 is a narrow annular flat surface which is adapted to rest against the surface to be measured. The surface 54 adjacent the outer periphery 46 is generally spherical in shape to permit the fluid passing between the measuring surface 46 and the surface thereby measured to escape rapidly once it has passed the measuring surface 46. By closely regulating the size of measuring surface and by maintaining the measuring surface 46 square with the surface to be measured, the gauge is given optimum speed and range for measurement. The spherical or pivotal connection between the measuring head 40 and the tubular member 20 allows the measuring head to maintain squareness of contact with the surface to be measured.

When the measuring gauge is in use, the measuring surface 46 is maintained in contact with the general contour of the surface to be measured. For example, the measuring head 40 rests on a flat surface 56 as shown in FIGS. 1 and 2. By maintaining this contact the only passages, available for air flow, are between the measuring surface 46 and the minute changes commonly termed surface finish, or surface roughness, in the surface to be measured. Thus, the air flow is proportional to the surface roughness and is unaffected by the general contour of the surface.

Obviously, many modifications and variations of the present invention are possible in light of the above teachings. It is, therefore, to be understood that within the scope of the appended claims the invention may be practiced otherwise than as specifically described.

What is claimed is:

1. A fluid gauge for measuring surface finish comprising, a triangular base member; a pair of support members depending from two apices of said base member and being disposed in a plane intersecting the plane of the base member; fluid conducting means including passage means for conducting fluid and being secured to the third apex of said base member and being disposed in a plane intersecting the plane of the base member, a hemi-spherical end on said passage means; measuring head means for conducting fluid from said passage means to the surface to be measured including, a spherical recess sealingly mating with said hemi-spherical end an annular surface adapted to be disposed adjacent the surface to be measured and a fluid passage aligned with said passage means communicating between said spherical recess and said annular surface; and retaining means for freely retaining said spherical surfaces in abutting sealing relation and for permitting relative movement between said spherical surfaces so that said annular opening will be disposed substantially parallel to the surface being measured.

2. A fluid gauge for measuring surface finish comprising, a triangular base member; a pair of support members depending from two apices of said base member and being disposed in a plane intersecting the plane of the base member; fluid conducting means including passage means for conducting fluid and being secured to the third apex of said base member and being disposed in a plane intersecting the plane of the base member, a hemi-spherical end on said passage means; measuring head means for conducting fluid from said passage means to the surface to be measured and having a spherical recess sealingly mating with said hemi-spherical end, a fluid chamber, a fluid passage between said spherical recess and said chamber in fluid communication with said passage means, an annular surface having inner and outer edges and being adapted to be disposed adjacent the surface to be measured the inner edge of said annular surface defining the outer edge of said fluid chamber, and a spherical surface adjacent the outer edge of said annular member; and retaining means for freely retaining said spherical surfaces in abutting sealing relation and for permitting relative movement between said spherical surfaces so that said annular opening will be disposed substantially parallel to the surface being measured.

3. A fluid gauge for measuring surface finish comprising, three support means for supporting said gauge on the surface to be measured, one of said support means including fluid conducting means having a tubular portion and a spherical portion at one end of said tubular portion; a triangular body having the apices thereof secured to said support means; measuring means for controlling fluid flow between said gauge and the surface to be measured including a body portion, a recessed spherical portion on one side of said body portion sealingly mating with said support means spherical portion, an annular surface on the other side of said body portion adapted to be in contact with the surface to be measured, and fluid passage means through the body portion between the recessed spherical portion and the annular surface for providing fluid communication between said annular surface and said fluid conducting means; and retainer means for maintaining said measuring means on said one support means and for permitting said measuring means to pivot relative to said one support means to maintain said annular surface in surface to surface contact with the surface to be measured.

* * * * *